(12) United States Patent
Bain et al.

(10) Patent No.: US 7,901,532 B2
(45) Date of Patent: Mar. 8, 2011

(54) METHOD AND APPARATUS FOR BONDING AND DEBONDING ADHESIVE INTERFACE SURFACES

(75) Inventors: Peter Bain, Wakefield (GB); Giovanni Manfre, Verona (IT)

(73) Assignee: De-Bonding Limited (GB)

( * ) Notice: Subject to any disclaimer, the term of this patent is extended or adjusted under 35 U.S.C. 154(b) by 1495 days.

(21) Appl. No.: 10/551,335

(22) PCT Filed: Mar. 31, 2004

(86) PCT No.: PCT/GB2004/001366
§ 371 (c)(1),
(2), (4) Date: Sep. 29, 2005

(87) PCT Pub. No.: WO2004/087826
PCT Pub. Date: Oct. 14, 2004

(65) Prior Publication Data
US 2006/0219350 A1 Oct. 5, 2006

(30) Foreign Application Priority Data

Apr. 1, 2003 (GB) .................................. 0307504.1
Nov. 4, 2003 (GB) .................................. 0325658.3

(51) Int. Cl.
*B32B 38/10* (2006.01)
(52) U.S. Cl. ...................... 156/247; 156/275.5; 156/344; 523/440

(58) Field of Classification Search ................. 156/344, 156/584, 247, 272.2, 275.3; 523/440
See application file for complete search history.

(56) References Cited

U.S. PATENT DOCUMENTS

| | | | | |
|---|---|---|---|---|
| 4,698,687 A * | 10/1987 | Levin | ............................ | 348/765 |
| 5,609,954 A * | 3/1997 | Aizawa et al. | ............. | 428/317.5 |
| 6,936,644 B2 * | 8/2005 | Gilleo | ........................... | 523/205 |
| 2002/0007910 A1 * | 1/2002 | Bennett et al. | ................ | 156/327 |
| 2002/0159165 A1 * | 10/2002 | Ford | ............................... | 359/722 |
| 2003/0048619 A1 * | 3/2003 | Kaler et al. | .................... | 361/760 |
| 2004/0014860 A1 * | 1/2004 | Meier et al. | .................... | 524/394 |

FOREIGN PATENT DOCUMENTS

| | | |
|---|---|---|
| EP | 1 126 001 A2 | 8/2001 |
| WO | WO 98/50480 A1 | 11/1998 |
| WO | WO 00/75254 A1 | 12/2000 |

OTHER PUBLICATIONS

International Search Report, PCT/GB2004/001366, Dec. 17, 2004.

* cited by examiner

*Primary Examiner* — Mark A Osele
(74) *Attorney, Agent, or Firm* — Myers Bigel Sibley & Sajovec, PA

(57) ABSTRACT

The present invention relates to a system and a method of improving the debonding of two or more surfaces together. The invention utilises thermoexpandable microspheres and thermal energy to debond interfaces in an adhesive system or as vehicle carriers. It also discloses a method of curing the adhesive system prior to the debonding step so that the same adhesive system may be used for both phases. It is especially useful in the automotive industry for end of vehicle life dismantling.

42 Claims, 3 Drawing Sheets

FIG 1.B

METHOD AND APPARATUS FOR BONDING AND DEBONDING ADHESIVE INTERFACE SURFACES

RELATED APPLICATION

This application is a national phase application of PCT Application PCT/GB2004/001366, filed Mar. 31, 2004, and published in English on Oct. 14, 2004 as International Publication No. WO 2004/087826, which claims priority from British Application Nos. 0307504.1, filed Apr. 1, 2003, and 0325658.3, filed Nov. 4, 2003. These disclosures are hereby incorporated by reference herein in their entireties.

The present invention relates to a system and a method of improving the attaching or bonding of two or more surfaces together and a method of detaching or debonding them and an apparatus therefore. The method and apparatus of the invention is of particular, but not exclusive use, in the automotive, aeronautical, nautical, decorating, packaging and construction industries for adhesive bonding and debonding adhesive interfaces of panels, frames, films, joints, plates, glazing or any other such items which need to be bonded together and/or separated; in some instances the debonding system and method of the present invention may be applied to an adhesive. The present invention is also applicable to dentistry and surgery where it is desired to cement a dental filling or in bone joint replacement. The system of the present invention may also use the thermally expandable microspheres as a vehicle or transporter for other agents on their expanding shell surface and so aid in their dispersion within a matrix or other systems, including the cleaning industry or they may be used to disperse/mix multifunctional particles and/or nanoparticles so as to avoid clustering.

BACKGROUND TO THE INVENTION

It is known from the prior art to attach car body parts together, by for example, riveting or spot welding them together and more recently laser. A recent trend in the car industry is to use a modular construction for vehicles, whereby individual modules are connected/attached/bonded to form the main vehicle body and associated parts. Typically car door or body panels are welded and/or riveted together in order to achieve a tight attachment of the two parts. Welding uses intense heat to melt one or more of the interfaces of the parts and needs to be performed by specialists aware of the risks of intense heat, both to themselves and to car parts. The intense heat can cause the substrate surface to buckle or melt and great skill is required to ensure that only the sections/portions/spots needing to be welded actually receive the heat so as to minimise the potential for heat damage to other parts. In order to detach these riveted/welded parts strong mechanical strength is required.

It is also known in the prior art to use adhesive compositions to effect secure attachment of two surfaces/substrates of vehicle components. Adhesive compositions or glues have been widely used to secure windscreens to frames by applying the adhesive to one or both surfaces of the components and aligning them so that the surfaces are bonded/attached together. Typically the adhesive compositions contain curing agents in order to promote or accelerate the adhesive solidification process. The curing agents can be heat or moisture activated and are included in the composition so as to cross-link or polymerise the liquid adhesive into solid form and so accelerate the chemical bonding process. In order to detach the adhesive bonded component(s) thermo-mechanical strength can be applied to separate them. For example, in the instance of detaching a windscreen from a frame which has been firmly bonded in place as the adhesive sealant is hardened, typically involves the automotive glass fitter to remove the windscreen (usually in intact form) using a device comprising a cheese-wire or special knives to cut/saw through the hardened rubber along the periphery of the windscreen. This process requires strong physical force to separate structurally the cohesion strength of adhesive and can lead to musculo-skeletal conditions in the fitters themselves as a result of repetitive strain injury. Further problems associated with this method are that the cheese-wires can overheat due to friction, additionally the wires themselves can break. It is becoming routine in the automotive industry in an effort to minimise vehicle weight to improve performance and to reduce petrol consumption to employ adhesives to bond other car components such as door skins to frames, accordingly the use of adhesive compositions is becoming more widespread in this area of technology. In addition as the new End of Life Vehicle (ELV) Directive becomes implemented, there is a need for detachment or debonding of adhesives in the automotive industry so as to dismantle and recycle car parts such as bonded glazing, panels and so on in a quick, cost-effective, safe and if possible reusable way. Thus there is a need for improvements to debonding various surfaces.

Thermally expandable thermoplastic microspheres have been commercially produced for several years and have been used as fillers in polymers, paints, putty, plastisols, printing inks and as fillers in paper, paperboard and explosives. WO 95/24441 describes a substitute to polyurethane foams in the form of an adhesive composition for filling vehicle box parts and providing sound-proofing which includes 5-15% of expandable micro-spheres encapsulating alkanes. WO 00/75254 also describes adhesive and adhesive primer compositions comprising thermo-expandable microspheres, heat activation of the microcapsules creates a pressure along the interfaces of where the composition has been applied which reduces the surface adhesive bonding and shear or tear stress of the adhesive material. The reduction in chemical and/or physical bonding of the adhesion at the interface of the two bonded surfaces is due to the effect of the expanded microspheres so that they may be described as capable of debonding with no cohesive fracture when in their expanded state. The microspheres present at the interface change the structure of the bonding adhesive surface to create instant debonding when supplied with the appropriate trigger. The debonding surface energy is approximately one third lower than the cohesive fracture energy.

One of the problems associated with the automotive industry is that at the vehicle end of life (ELV) most of the vehicle components more than 85% have to be detached and removed from the vehicle so that they can be safely disposed of or recycled in separate and dedicated processes. The disposal of vehicles at the end of life can be time consuming, hazardous to health and the environment and expensive as interior items, dashboards, panels, door skins, plates, frames, light units and other such components need to be detached from one another.

A method and apparatus to carry out a method which would enable rapid, ideally in a matter of minutes, non-toxic material degradation in an efficient manner and safe detachment of such components would offer immediate advantage to the prior art, not only in the automotive industry but in any field where it is desired to detach two surfaces/substrates that have been adhered (bonded together) by means of an adhesive bonding system that can be present in either an adhesive and/or primer and/or cleaner component of the system.

It is envisaged that the method of the present invention may be used in many diverse areas where microspheres are used, for example and without limitation, in cleaning and hygiene, dentistry, surgical medicine, sports equipment manufacture, furniture and finishings especially decorative wallpaper and other situations where it is desired to detach more than one surface. The increased volume of expanded microspheres may also be used to aid transport and dispersion of agents deposited on their surface so mitigating the problem of clustering and agents responsible for clustering a phenomenon associated with decreased functional activity.

STATEMENT OF THE INVENTION

Various aspects of the present invention will now be described in more detail with respect to other embodiments described herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. Also, as used herein, "and/or" refers to and encompasses any and all possible combinations of one or more of the associated listed items.

Unless otherwise defined, all technical and scientific terms used herein have the same meaning as commonly understood by one of ordinary skill in the art to which this invention belongs. All publications, U.S. patent applications, U.S. patents and other references cited herein are incorporated by reference in their entireties with respect to the text referenced by the citation.

According to a first aspect of the invention there is provided a method of debonding two or more surfaces or supports or layers of an adhesive system, the adhesive system comprising an adhesive composition at its bonded surface(s), the composition being placed between said surfaces or supports or layers, and the adhesive composition comprising an adhesive agent and/or a primer and/or a cleaner at its interface and dispersed therein thermoexpandable microspheres, in order to debond the system a sufficient power level of thermal radiation and/or thermal energy is provided which concentrates on the adhesive surfaces so as to expand the microspheres in the adhesive and/or a primer and/or a cleaner layers and so causes weakening of adhesive surface forces at the interface of said layers in the adhesive system.

Preferably, the weakening of the adhesive forces at the interface of said layers does not cause cohesive fracture or degradation of the matrix, especially toxic degradation of the matrix.

Preferably, the method further includes the step of curing the adhesive composition prior to debonding by providing a power level of thermal radiation and/or thermal conduction and/or thermal energy which passes through the adhesive composition so the contents of the expanded microspheres leach or migrate through their porous shells into the matrix of the composition.

Preferably, the microspheres used in curing are uniformly distributed in the adhesive matrix.

The present invention differs from the prior art in that the adhesive system comprising thermoexpandable microspheres at the cleaner and/or primer interface is not directly heated rather the microspheres themselves receive energy in the form of thermal radiation from an IR or UV source or electrical source and/or thermal conduction from the surface of the item which is to be bonded. We have found surprisingly that it is not necessary to heat the entire adhesive system/composition as microspheres appear to preferentially absorb thermal radiation from IR and that certain microspheres are able to expand at a lower temperature than that of the composition. We have found that certain microspheres when exposed to IR energy expand at approximately 40° C. less than the adhesive in which they are mixed. In this way we have unexpectedly found it is not necessary to heat the adhesive composition in order to expand the microspheres but rather to heat the microspheres themselves. Accordingly this provides the additional advantage of minimising energy consumption and reducing the risk of damage to the bonded substrates.

Reference herein to an adhesive system is intended to include an adhesive composition comprising at least one adhesive agent with or without a primer and/or cleaner or curing agent or solvent or any other material which is included to effect adhesion of one or more surfaces together either as layers or sandwiches. The adhesive composition embeds or supports the microspheres and in the instance of the adhesive layer being comparable with the size of the microspheres both sides of the adhesive layer can be affected by the microspheres and triggered from both sides.

Reference herein to a cleaner and/or primer is intended to include any surface treatment to promote the adhesion of adhesives and/or sealants.

The present invention provides a method and apparatus for debonding an adhesive system wherein the system comprises thermoexpandable microspheres dispersed in an adhesive composition the composition being placed between two or more surfaces of the system and optionally a method of curing the same composition.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

According to a second aspect of the invention there is provided an adhesive system comprising curing an adhesive composition and/or de-bonding the same adhesive composition at its bonded surface, the composition being placed between two or more surfaces of supports or layers, and the adhesive composition comprising an adhesive and/or a primer and/or a cleaner at its interface and dispersed therein thermo-expandable microspheres the system comprising the steps of:

(i) activating a method of curing the composition by providing a first power level of thermal radiation and/or thermal conduction and/or thermal energy which passes through the adhesive composition so the contents of the expanded microspheres leach or migrate through their porous shells into the matrix of the composition; and (ii) de-bonding adhesive interfaces of the same surfaces of supports or layers by providing a second power level of thermal radiation and/or thermal energy which concentrates on the adhesive surfaces so as to expand the microspheres in the adhesive and/or a primer and/or a cleaner layers and so causes weakening of adhesive surface forces at the interface of said layers in the adhesive system.

Preferably, in the curing step the microspheres release their contents uniformly into the adhesive matrix.

The method of the present invention thus may comprises two distinct phases or stages which not only are controllable but in practice are performed at two different time points. It will also be appreciated that the adhesive system may use each of the distinct phases in isolation, that is to say it may only be used to debond an adhesive system according to the first aspect of the invention or the may be performed with the same adhesive composition so as to cure and debond the same system as in the second aspect of the invention.

The curing phase occurs subsequent or immediately after deposition of the adhesive composition and the debonding phase typically may be performed days, weeks, months or years apart from the curing phase. With this in mind it is important that the microspheres used for curing are able to lay dormant, that is to say do not leach their contents into the composition matrix or in the stock before application; the debonding phase occurs in the cleaner and/or primer interfacing but not until the microspheres are triggered so by application of thermal energy instigated on command by a user.

The first phase or stage is curing; Curing is generated by a first species of thermally expandable microspheres dispersed in the adhesive bead matrix. This first species encapsulates within their plastic or copolymer shell a blowing agent and curing agent preferably mixed together and they may optionally further include a catalyst or activator. The curing agent disperses in the adhesive matrix when sufficient thermal radiation and/or thermal conduction and/or thermal energy and/or electrical energy is supplied to this first microsphere species so as to cause their thermal expansion and allow their contents to leach or migrate or pass or be transferred or released through or across the porosity of the expanded shell. The contents of this first species of thermally expandable microspheres is released into the adhesive matrix at a certain specified temperature which is typically lower than that of the second species of thermally expandable microspheres which are employed to effect interface debonding. The second species of microspheres, i.e. those which are activated at an different and typically elevated temperature to those of the first species are preferably provided substantially as a blend in the cleaner and/or primer interfacing of adhesive compositions to facilitate separation of the surfaces. Alternatively, the microspheres used in debonding can be provided as a blend in the adhesive itself, especially in adhesive systems requiring a low thickness or thin layer of adhesive composition comparable with the size of the microsphere in this way the microspheres may be triggered from both interfaces of the layer.

It will be appreciated that the microspheres may be present dispersed throughout an adhesive composition or they may be present in a primer or cleaning layer or in a paint layer so that when thermal energy is supplied to expand the microspheres they change the surface structure of the material in which they are dispersed so as to create an instant debonding effect.

The present invention resides in providing energy in the form of radiation and/or thermal conduction and/or electrical heating to the microspheres of either or both phases of the method of the first and second aspect of the invention. The thermal conduction and electrical heating to the microspheres for debonding is provided via contact with the surface of the substrate or by electrical current or heat passing through the adhesive composition or system. It will be appreciated that microwaves or supersonic waves may also be employed as a thermal source.

In the present specification, bonding refers to the physicochemical process of adhesion during the curing process and particularly this bonding in the present specification is additionally increased by creating an increased rough or uneven surface on the area of interface especially by the thermoexpandable microspheres of the debonding microspheres in their initial state mixed in the cleaner and/or primer. Accordingly, the present invention advantageously is able to not only increase the speed of curing but also to strengthen the adhesive properties of the composition at interfaces.

The debonding microspheres are suspended in the composition positioned or floating on the uppermost surface and with a suitable size they purposefully create a rough or uneven increased surface area and thus provide higher mechanical and stress strength as compared to an adhesive without microspheres.

Debonding refers to the physical breaking of the chemical formulation in the adhesive system and breaking of the chemical bonding forces at interfacings.

Expansion of the microspheres at the interface surface increases their volume so that the microspheres fill the entire surface space and substantially fill or occupy the whole interface surface, thus allowing for the breaking of bonding forces at the interface or interface layers.

In the present specification, the curing process refers to a process separate and distinct from the bonding and debonding process hereinbefore described. The purpose of the curing process is mainly to impart mechanical structural strength to the adhesive composition and chemical bonding at an interface, it does not effect the volume of the adhesive bead rather it effects the mechanical behaviour of the bead and the chemical bonding at the interface.

Preferably, inside the encapsulating shell of the first species of microspheres used for curing, the curing activator may be mixed with blowing liquid and optionally a catalyst so that when activated by thermal energy the contents pass through the porous shell of the expanded microspheres supported by the leaching of expanding gas. In the case of an activator from the leaching of the blowing agent, their action of curing is distinguished from the process following uniform distribution in the adhesive matrix. This may be achieved by UV radiation in the case of activators that are photo-radicals or photo-ions, accordingly in this instance the activator leaching aids the uniformity of mix within the matrix.

Preferably, the expanding agent is selected from the group comprising an expandable gas, a volatile agent, a sublimation agent, water, an agent which concentrates water or an explosive agent.

Preferably, the adhesive is polyurethane or polyvinylchloride or an MS polymer or an epoxy resin or any other suitable adhesive in which microspheres may be dispersed and which it is desired to strengthen or cure more rapidly. Thus, when the microspheres are used in dental situations the adhesive is a dental filling mixture and when used in surgical situations may be of a bone type cement.

Preferably the microspheres encapsulating the curing agent of the first species of microspheres are activated at a different temperature compared to that of the second species, preferably the first species activation temperature is lower that of the second species and the temperature difference is between 20 to 100° C.

Preferably, the debonding or second species of microspheres are activated in a temperature range of about 30 to 250° C. and more preferably at about 110 to 200° C. Preferably the second set of microspheres encapsulate an expanding agent and are of smaller cross sectional diameter than the first species of microspheres.

It will be appreciated that in the first aspect of the invention only the second species of microspheres are required and optionally may include the first species whereas in the second aspect of the invention the adhesive system comprises both species of microspheres.

In one embodiment of the invention where the microspheres are used in the cleaning industry and especially as washing powder dispersing aids the temperature activation will be in the lower end of the range, probably in the region of 30 to 80° C., a temperature compatible with domestic hot water.

In another embodiment of the invention where the microspheres are used in dental fillings the temperature activation range is in the region of 40 to 70° C., a temperature compatible with oral conditions.

From the foregoing it will be appreciated that the temperature activation range is dependent on a users requirements and as such the temperature activation of the microspheres is not intended to limit the scope of the application since it is the methodology of debonding at an interface which is the essence of the invention and optionally curing beforehand.

The shell of the microsphere is typically made of a copolymer acrylic and PMMA mix which has hitherto prevented their possible use below around 80° C. We propose to adapt the composition of the shell by including plastics such as polypropylene, PVC and/or polyethylene in this way the microspheres may expand and much lower temperatures and so find use with the method of the present invention in dental, medical and cleaning (washing powder) situations.

It will be appreciated that when using microspheres for both curing the adhesive and bonding/de-bonding microspheres at interfaces a sufficient temperature difference is required so that the two processes may be achieved without overlap and thus distinct temperature ranges are preferred. It will also be appreciated that the composition may also comprise thermoexpandable microspheres encapsulating more that one different or combinations of agent and that each set or species of microspheres may differentially be expanded when exposed to suitable temperatures so that the composition may go through a set of defined processes according to the applied temperature which can be specified. Accordingly the method of the present invention is equally applicable to sticking and un-sticking, for example, wallpaper which will require a low thermal activation or it may be used to bond and de-bond vehicle parts which will require relatively higher thermal activation.

Preferably, the ratio of the proportion of the first species of microspheres encapsulating the curing or other agent to those of the second species encapsulating the debonding agent will be variable and it will be appreciated that the proportion may be selected according to a user's requirements or for the particular application in mind and thus should not limit the scope of the application.

Preferably, the second species of microspheres may be coated in a suitable black or dark material to increase optical density and thus prevent UV light penetration to degrade the adhesive, in this embodiment the "trigger" would be an IR or electrically generated thermal source. In one example when the method and composition is for use with vehicle glazing, the frit can be coated with microspheres coated with a dark material with a purpose to further reduce penetration of UV light and to reduce degradation of the adhesive.

It will be appreciated that by coating the microspheres with a black material this acts to reduce the optical density of the frit on the windscreen or, if desired, stereographical printing. We have found that it is necessary to coat the microsphere in the appropriate material as the coating affects their porosity. Thus when the microspheres expand, the porosity of the frit is affected and in practice, this creates a barrier to the UV. The expandable microspheres by virtue of the porosity of their spherical shell surface may be used advantageously to disperse nanoparticles and hence prevent or minimise clustering during mixing of a dispersion composition which includes a curing plastic and a solvent. In this way, following evaporation of the solvent the microspheres may act as a dispersant to avoid nanoparticle clusterization.

In this embodiment of the invention, that is to say coating of the shell of the microspheres with additional agents, the unexpanded microspheres may be coated with agents depending on the user's requirements. For example the unexpanded microspheres may be coated with, for example and without limitation:

- a monomer to be catalysed by UV radiation or other energies for improved adhesion in a polymer matrix
- nanoparticles to improve their distribution and/or their dispersment.
- molecules which create barriers to, for example, electromagnetic waves, chemicals, $O_2$ degradation in the food packaging industry so preventing premature spoiling, acoustic and sound waves, thermal or any other function for which it is desired to create a barrier.

These functions operate on the expanded surface which can realise up to 10 $m^2$ for only 1 gram of microspheres present in the matrix. It is believed that the present invention may be used to improve the dispersment of, for example and without limitation, scent, fragrances and/or cleaning agents into a solvent such as water. It may also be used to improve the delivery of pharmaceuticals and other such agents. It may also be used as a barrier to prevent clustering of nanoparticles and such like. In addition nano-scavangers maybe used as a barrier to the atmosphere and so prevent food deterioration inside packaging film or paper boxes/cartons.

In one embodiment of the invention, the shell of the microspheres can be coated with suitable molecules on their surface or they may encapsulate them so that the microspheres act as a "vehicle" or "transporter" to enhance the effect of the carried molecule, and in so doing the microspheres may improve efficiency and dispersion of the carried molecules. It is envisaged that the microspheres may, in this embodiment, be used following the principles as set forth:

- the microspheres may be used as a vehicle for dispersing a carried molecule on its coating or which it encapsulates to a larger molecule.
- the microspheres may act as a chemical or physical barrier.
- the microspheres prepare molecules to be evenly, easily and more readily dispersed.
- the microspheres can act as a support where photocatalysis is efficient as the molecule acts as a very thin film on the expanded microsphere surface.

In summary, the shell of the microspheres can be coated with or encapsulate various materials making them multifunctional and useful for addressing many problems and of use in many different areas. As previously stated the microspheres can be coated with or encapsulate either a monomer and/or nanoparticles or a detergent or gold and these entities can be distributed on the surface of the microspheres in their unexpanded state and be multifunctional. We have utilised the change in volume of the microspheres so that their surface becomes up to ten times more than their initial surface so one can achieve, from a single gram of microsphere in the matrix about 0.5 $m^2$ and if we use microspheres of a different expansion capacity for example of up to 100 times the volume expanding we can achieve between 6 to 10 $m^2$ of surface. In such an embodiment, the microspheres can be used to disperse the parts of the materials i.e. monomer and/or nanoparticles that are on their surface. In practice, we have found that clustering can be avoided when the unexpanded or initial microsphere shell is loaded with nanoparticles of 20 nm diameter, in the expanded state where the nanoparticles remain on the shell surface 76% distribution was achieved.

In this sense the microspheres act as a vehicle to make the coated particles ready to be dispersed in the salvage state in order to reduce the time of their dispersion and obtain a uniform distribution on the expanded microsphere surface. Accordingly it is possible to achieve a surface that will attain the same longevity with the same particles because the shell reduces thickness but the materials that are on the surface of the expanded microspheres remain the same.

The microspheres may also be used according to a second critical observation in that they tend to become a barrier for electromagnetic radiation and also a barrier to acoustic waves passing through such a matrix containing them. They may also be a barrier to atmospheric degradation in the food packaging industry.

The microspheres may also be used to prevent clustering, that is to say clumping together of molecules a problem associated with the cleaning industry.

Preferably, the thermal radiation and/or thermal conduction or electrical energy provided to the microspheres is provided from a means comprising a source of electromagnetic waves such as IR or UV radiation, or from a convection oven or from electrical means such as a battery or a laser or from an ultrasonic source or from gas or air or from white light.

In the instance of using the adhesive system as a backing in decorative paper the debonding can be effected by for instance a domestic iron or hair dryer.

As will be appreciated IR is an electromagnetic wave which only becomes thermal when it is absorbed by a body with certain properties onto which the IR is directed. Thus a system employing IR only becomes a "thermal" system when the IR beam is absorbed by the body. Accordingly IR radiation becomes a heating source by changing the IR electromagnetic waves of 800-2600 nm up to thermal radiation 3000-7000 nm and thermal conduction. In the present invention the thermoexpandable microspheres are principally heated by IR or UV and/or thermal radiation and not thermal conduction from for example a metal panel.

In the instance of using IR radiation spectrum as the energy source, it will be provided in the form of one or more lamps or in the form of optical fibres or optical rods or plates. IR radiation will be transformed to thermal radiation of the internal surface, of for example a panel, on the heating side which strongly depends on the temperature achieved by the panel exposed surface. The power thermal radiation depends on the T exp 4 of the surface panels which is not within the low range of IR radiation as the lamp, but with thermal IR radiation of about 3000-7000 nm. It will be appreciated that heating by conduction depends on many parameters such as the thermal conductivity of the material of the surfaces or panels, the cleaner-primer and the composition of adhesives layer.

In the instance of using an electrical heating as the heating source to expand the microspheres, the electrical heating can be generated by electrical current passing through a panel which becomes a resistor. In one embodiment of the invention, aluminium or steel wires/filaments/strands or micro-wires or carbon microfibres or other electrically conductive fibres such as metal coated glass fibres are embedded in the adhesive composition especially at the adhesive interface so as to create a Faraday cage. The micro-wires are dispersed in the adhesive to create a tangle or polygonal arrangement of electrical conductors. This tangle allows a great number of small electrical rings to be formed in three dimensions all around the expandable microspheres which can be caused to expand at a certain maximum temperature. This phenomenon is referred to as tunnelling for electrical current.

Preferably, the micro-wire or fibres are mixed with the adhesive and may be around 100 μm in length and between 2-20 μm in diameter. In one example, carbon fibres could be 5-10 μm in diameter and 50-100 μm in length. We believe that in order to effect tunnelling the composition should ideally comprise about 0.5-10% volume of the micro-wires and more preferably about 1-3% volume. It will be appreciated that the volume % of microspheres within the composition affects the number of contacts bridging one with another and that this may be selected according to a user's requirements.

Preferably, the thermoexpandable microspheres may be provided embedded or coated on to a tape or mesh or film or may be provided attached to a wire or filament or fibre alternatively they may be attached to a contact surface of one or both component which it is desired to cure and/or separate. The first species of microspheres may be Preferably, the released curing or activating agent is uniformly distributed in the adhesive matrix so that they may be activated with their own energy system such as polymerisation and/or cross-linking or UV activation of photo-radicals and/or photo-ions.

Accordingly the present invention provides a unique approach to prior art methods of plastic-plastic, plastic-metal, metal-metal, ceramic-metal, aluminum-aluminium, aluminium-plastic, composite-metal, composite-plastic, composite-ceramic, paper-wall, dental-filling-tooth, artificial joint-bone and the like surface attachments since the composition is not directly targeted by for example an IR or UV beam transparent to one of the sandwich panel but rather the composition is heated by thermal radiation and/or thermal conduction of the contact surface or its under-surface.

Preferably, the method includes any one or more of the features hereinbefore described.

In particular we have found by experimentation, investigating parameters of the IR lamp such as reflection, power and optical spectrum of the ray's beam, that in order for IR to be absorbed by the blowing agent and its mixture it has to be adapted for expanding the microsphere at a temperature before the degradation of the matrix embedding the microsphere or before the degradation of the adhesive system, where the microspheres are embedded in the primer and/or cleaner interface. In this way, toxic agents, due to the degradation of the adhesive may advantageously be avoided even with PU adhesives.

According to a further aspect of the invention there is provided a method of detaching two surfaces that have been bonded together comprising, supplying sufficient thermal radiation and/or thermal conduction to a surface having coated thereon or attached thereto the composition as hereinbefore described, the thermal energy being supplied to one or both contact surfaces of each item which are to be detached/separated so as to cause a proportion of the thermoexpandable microspheres to release an expanding agent into the composition.

Preferably, the method includes any one or more of the features hereinbefore described.

It will be apparent that in the present invention, chemical interactions are avoided and that the method of the present invention relies on physical engineering technology to permit and facilitate a curing system which needs to mix the curing activator by a uniform distribution at certain time at command in the adhesive bonding stage process and advantageously may also differentiate zones where the thermoexpandable microspheres can be suitably mixed. In principle the thermoexpandable microspheres act as microscopic containers of the curing activators which are neutral or inert up to a certain moment when they break or increase their volume in such a way to initiate their shell as a porous wall to leach the activator, in gas or liquid state, so that it can diffuse uniformly in to the adhesive matrix transport by the gas of blowing agent.

Activation of different activators is possible by the differentiation of temperature activation for the thermoexpandable microspheres, in this way it is possible to effect curing of the adhesive composition at different stages in the process at different areas and moreover at applied and specific commands making the overall process more controllable and with multifunctional performances.

The present invention advantageously provides a curing process that is controllable in that it is not dependent on a chemical reaction such as polymerisation, cross-linking, crystallisation, gelification or any other phase transitions.

According to a yet further aspect of the invention there is provided an apparatus for attaching or detaching two surfaces that have been bonded together comprising an IR emitting device comprising at least one bulb, at least one lens to concentrate the beam at certain area and at least one reflecting mirror mutually arranged so that heat is directed or focused only at an adhesive interface or an adhesive interface with a cleaner and/or primer or a path where the thermoexpandable microspheres are purposely present.

In one embodiment of the invention the IR emitting device is in the form of one or more lamps and typically is in the form of a group or plurality of lamps.

Preferably, the IR device emits IR radiation in the range of about 800-1400 nm to 2000-6000 nm.

Preferably, the device is automated and may be linked to a computer programme providing information to device sensors of an adhesive bonding-path.

Preferably, the device is mounted on a mobile unit so that it is free to follow a predefined adhesive bonding path.

The arrangement of the device of the present invention allows the IR beam to be concentrated only at certain partial points of the surface which it is desired to bond or de-bond.

Preferably, lenses with parallel shape of the adhesive-thermoexpandable microsphere, bonded paths can be used with standard IR lamps where the beam can be concentrated in a special area. In this heating concept the IR optical fibre or optical tubes, even with the laser source, can be used as a flexible or rigid heating tool producing strong and rapid power by rapidly moving along the bonded area with special designed drawings of adhesive parts.

Preferably, the device may be pre-programmed to follow a specific bonding path.

According to a yet further aspect of the invention there is provided a method of de-bonding an adhesive composition, the composition being present at an interface and being placed between two or more surfaces of vehicle glazing or vehicle panel(s) or part(s) the composition comprising an adhesive or cleaner and/or primer and thermoexpandable microspheres dispersed therein the microspheres having a diameter of between 10-50 µm and an activation temperature range of between 110-210° C. and encapsulating at least one blowing agent the debonding being effected by exposing the microspheres power level of thermal radiation and/or thermal energy that results in a temperature received by the microspheres in the range of 110-210° C.

Preferably, the method further includes the step of curing the adhesive composition prior to debonding by providing microspheres 30-50 µm and an activation temperature range of between 50-100° C. the microspheres encapsulating a curing agent and/or catalyst and/or activator and effecting curing by exposing the microspheres power level of thermal radiation and/or thermal energy that results in a temperature received by the microspheres in the range of 50-100° C.

According to a yet further aspect of the invention there is provided a method of curing an adhesive and de-bonding the same adhesive from automotive glazing or panels or parts comprising applying a composition comprising an adhesive and thermoexpandable microspheres dispersed therein, a first set of microspheres having a diameter of between 30-50 µm and an activation temperature range of between 50-100° C. and a second set of microspheres having a diameter of between 10-50 µm and an activation temperature range of between 110-210° C. the second set of microspheres being present at an interface of the adhesive or cleaner and/or primer, the composition being placed between two or more surfaces of the glazing or panel or part(s) and:

(i) activating curing of the composition by exposing it to a first power level of thermal radiation and/or thermal energy that results in a temperature received by the microspheres in the range of 50-100° C.; and (ii) de-bonding the adhesive system at its interfaces by exposing it to a first power level of thermal radiation and/or thermal energy that results in a temperature received by the microspheres in the range of 110-210° C.

As mentioned herein before the steps of curing and debonding may be performed in isolation with the same composition or may be debonded with or without a curing phase, the requirement for a curing step is not intended to limit the scope of the application.

The system in step (i) activates curing of the adhesive composition, by exposing them to a first level power of thermal radiation and/or thermal conduction or a thermal energy. This thermal energy passes through the adhesive system to the microspheres; so the contents of the expanded microspheres leach or migrate through the porosity of the microspheres shell. The shell thickness is reduced due to its expanded state. Its contents leaches or migrate into the matrix of the adhesive composition thus releasing a curing agent or catalyst or activator, into the matrix. This process occurs subsequent to adhesive deposition on the glass or plates.

The system in step (ii) debonds adhesive interfaces of the same glazing or panel or part treated with the method (i), by exposing them to a second power level of thermal radiation and/or thermal conduction and thermal electrical energy. This second power level activates the microspheres so they expand and so weaken and/or debond the surface adhesive system forces at temperature advantageously lower than the degrading temperature of the adhesive system composition.

It will be appreciated that step (i) may occur just after the bead adhesive deposition and trigger the microspheres expansion to generate the leaching of the blowing glass containing the catalysts of the adhesive matrix to a curing process; step (ii) may occur after 10 to 15 years. This second step may be trigger the dormant microspheres by exposing the adhesive surfaces to a second power level energy by IR or electrical systems generating thermal energy.

The present invention provides an elegant method for curing and debonding of the same adhesive. Bach stage being a discrete operation that may be performed up to 10 years or more apart since the microspheres are able to lay dormant in the composition until triggered at command by an appropriate stimulus for example IR or electrically generated thermal energy.

The invention will now be described by way of example only with reference to the following Figures wherein:

FIG. 1B shows an electron microscope picture of a tangle of micro-wires and thermoexpandable microspheres;

DETAILED DESCRIPTION OF THE INVENTION

Figure 1A:
FIG. 1A shows an electron microscope picture of an upper surface of an interface to be bonded.
Figure 1C:
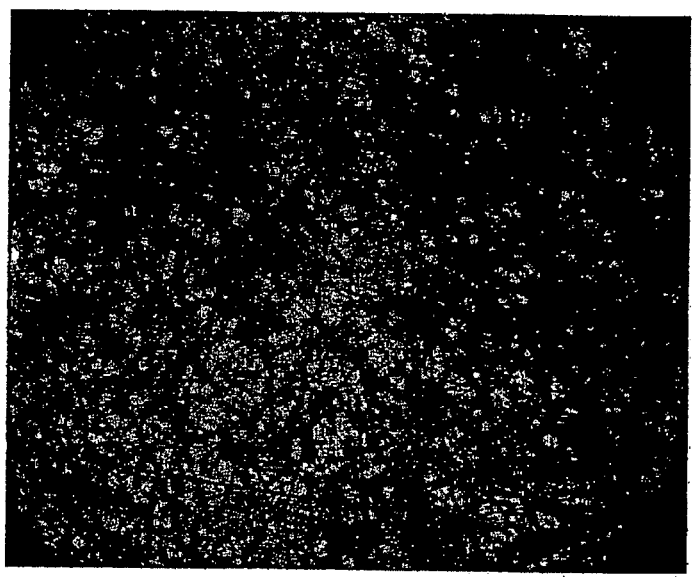
FIG. 1C shows a higher power view of FIG. 1B and a micro-wires.
Figure 1C:
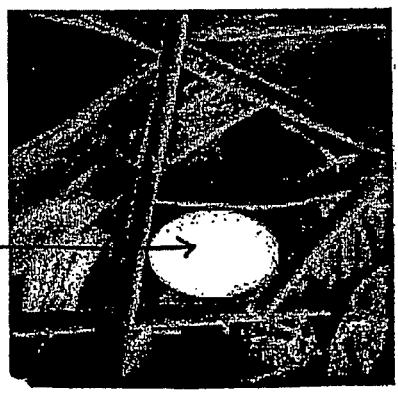
Figure 1D:
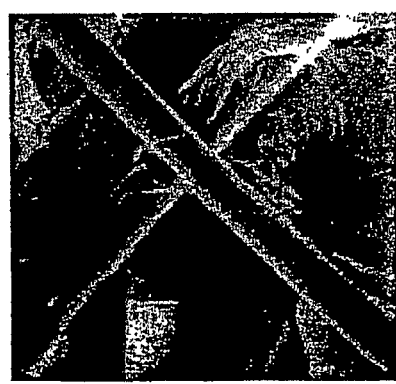
FIG. 1D shows an alternative view of FIG. 1C and a micro-wire.
Figure 2:
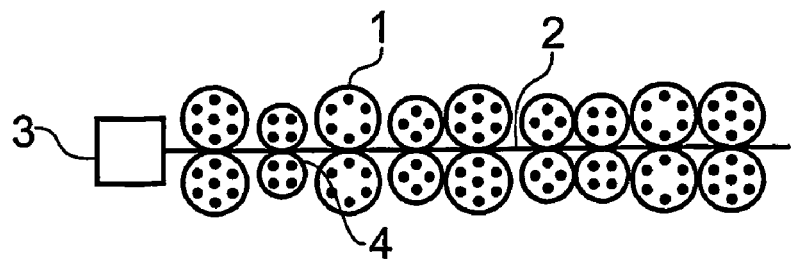
FIG. 2 shows a schematic plan view of a microcapsule and film arrangement.

With reference to FIG. 1A there is shown an electron microscope picture of the surface of a primer adhesive interface coated with the composition and microspheres according to the present invention; Microspheres 1 can be seen projecting above the surface thus providing an uneven or rough surface. There are gaps between the microspheres. However these gaps or voids are filled once the microspheres have been expanded so that the surface will become more even and thus be able to be debonded. In FIG. 1B there is shown an electron microscope picture of a tangle of micro-wires and inter-dispersed microspheres are also visible. As described earlier aluminium or steel wires/filaments/strands, carbon microfibres, metal coated glass fibres or micro-wires are embedded in the adhesive composition especially at the adhesive interface so as to create a Faraday cage. The micro-wires are dispersed in the adhesive to create a tangle of electrical conductors. This tangle allows a great number of small electrical rings to be formed in three dimensions all around the microspheres which can be caused to expand at a maximum temperature. FIGS. 1C and 1D are electron microscope figures at higher powers of magnification.

In one embodiment of the invention, the microspheres (1) and micro-wires (2) can be attached to a continuous conductive filament or film or wire or fibre (4). Energy is supplied to the conductive filament (2) from an energy source (3), the energy source may be provided in the form of thermal energy or electrical power and transmitted to the microcapsules by thermal radiation and/or thermal conduction. Thus the microcapsule do not receive energy directly from the energy source but rather via the panel or component surface which is to be bonded, for example the microspheres may be heated by thermal radiation and/or thermal conduction of the panel, directly targeted by an IR radiation lamp focused on the open/exposed surface. In a yet further embodiment of the invention microcapsules (1) may be coated on to a mesh or bundle of conductive filaments/wires/fires or coated on to a tape or woven material. The microspheres (1) may be provided in a prearranged form or may be sprayed or painted on shortly before use. Once sufficient thermal radiation and/or conduction is imparted to the microspheres they may be activated at a selected temperature so as to accelerate and/or effect attachment in the initial state and debond in the expanded state. In the second phase with microspheres containing a blowing agent mixed with a curing activator in the instance of two surfaces having already according to the present invention. Microspheres 1 can be seen projecting above the surface thus providing an uneven or rough surface. There are gaps between the microspheres. However these gaps or voids are filled once the microspheres have been expanded so that the surface will become more even and thus be able to be debonded. In FIG. 1B there is shown an electron microscope picture of a tangle of micro-wires and inter-dispersed microspheres are also visible. As described earlier aluminium or steel wires/filaments/strands, carbon microfibres, metal coated glass fibres or micro-wires are embedded in the adhesive composition especially at the adhesive interface so as to create a Faraday cage. The micro-wires are dispersed in the adhesive to create a tangle of electrical conductors. This tangle allows a great number of small electrical rings to be formed in three dimensions all around the microspheres which can be caused to expand at a maximum temperature. FIGS. 1C and 1D are electron microscope figures at higher powers of magnification.

In one embodiment of the invention, the microspheres (1) and micro-wires (2) can be attached to a continuous conductive filament or film or wire or fibre (4). Energy is supplied to the conductive filament (2) from an energy source (3), the energy source may be provided in the form of thermal energy or electrical power and transmitted to the microcapsules by thermal radiation and/or thermal conduction. Thus the microcapsule do not receive energy directly from the energy source but rather via the panel or component surface which is to be bonded, for example the microspheres may be heated by thermal radiation and/or thermal conduction of the panel, directly targeted by an IR radiation lamp focused on the open/exposed surface. In a yet further embodiment of the invention microcapsules (1) may be coated on to a mesh or bundle of conductive filaments/wires/fires or coated on to a tape or woven material. The microspheres (1) may be provided in a prearranged form or may be sprayed or painted on shortly before use. Once sufficient thermal radiation and/or conduction is imparted to the microspheres they may be activated at a selected temperature so as to accelerate and/or effect attachment in the initial state and debond in the expanded state. In the second phase with microspheres containing a blowing agent mixed with a curing activator in the instance of two surfaces having already been attached together by an adhesive may be made to expand and release their contents at a different selected temperature and release an expanding agent such as a gas, an agent capable of sublimation, water, an explosive agent containing an activator agent. The resultant expansion causes a de-bonding or a faster bonding of the two attached surfaces.

Figure 3:
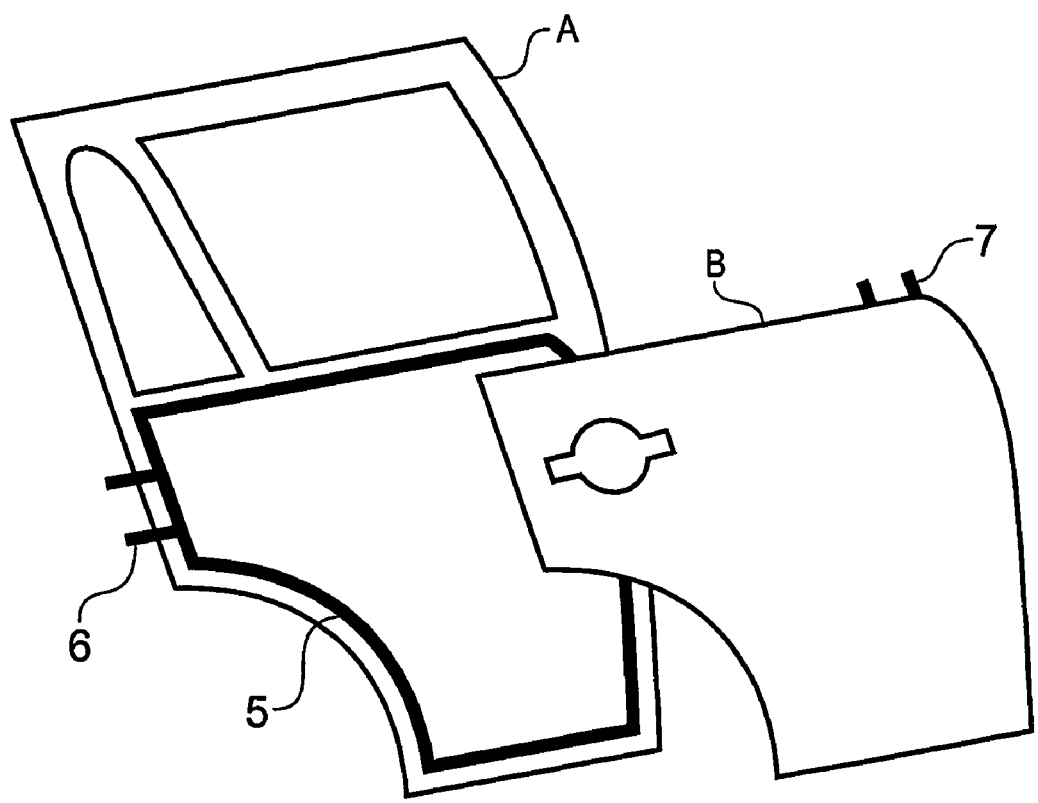
FIG. 3 shows a front perspective view of a vehicle door-frame and skin with a conductive pathway in situ.

In the instance of attaching a vehicle door skin (B) to a frame (A) as in FIG. 3, the microspheres may be provided in pre-defined paths along the perimeter of the article which it is desired to attach. Path (5) may be in the form of a channel or groove into which the adhesive composition may be poured/sprayed or the microspheres may be provided already attached in the form of a mesh or tape or strip which can be appropriately positioned on either or both of the skin (B) or frame (A). The door frame (A) and/or skin (B) is provided with a plurality of conductive attachment means (6) and (7) respectively which can be connected to an energy source. Once the energy source is activated and the microspheres receive sufficient thermal radiation and/or conduction for example from an IR lamp of the present invention, they may expand and release their contents to effect attachment at a selected temperature or to cause de-bonding at a different selected temperature. In this way and conveniently, adhesion of two surfaces and separation of same may be achieved without recourse to chemical or physical processes using the same system and apparatus. Moreover and advantageously the system is controllable since the microspheres in the adhesive system will be selected according to the user's requirements of curing and bonding and debonding methods.

Figure 4:
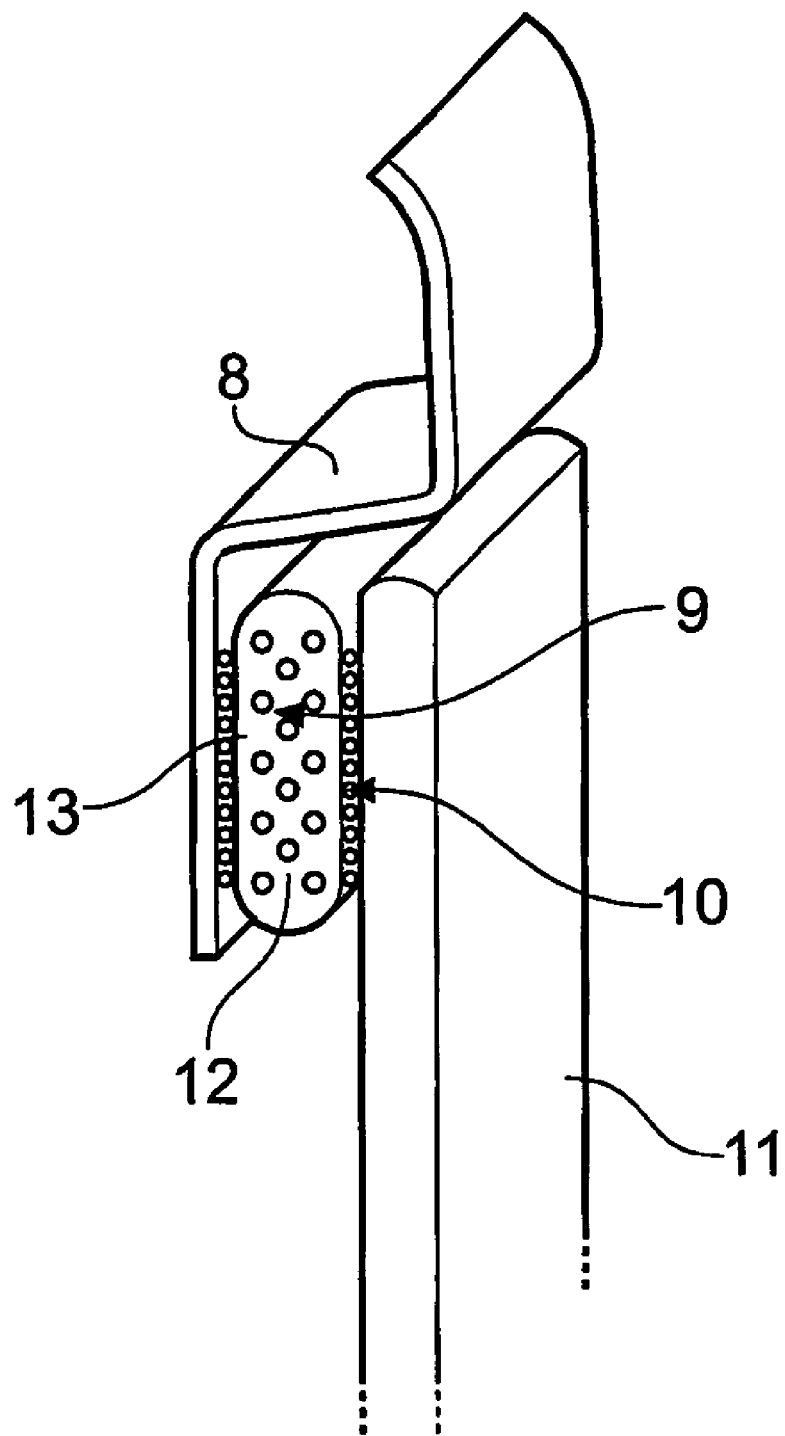
FIG. 4 shows a plurality of possible interfaces in the adhesive system of the present invention.

With reference to FIG. 4 there is shown a representation of a plurality of different interfaces which are to be included within scope of the method of the present invention. For example the vehicle glass (11) to cleaner and/or primer (10), cleaner and/or primer (10) to adhesive (12), adhesive (12) to primer or paint (13) and primer or paint (13) to the metal part or similar (8).

It will be appreciated that the invention has wide application to may different fields of technology where it is required to attach and detach two surfaces together for example and without limitations surfaces such as plastics, metal, ceramic, fibreglass and/or composites thereof, and that the examples in the present specification are not intended to limit the scope of the application.

EXAMPLES

With reference to the table below, various samples of microsphere compositions have been tested. It will be appreciated that the temperature activation ranges are dependent on the intended uses and as such on which type of thermal energy is applicable for curing/bonding/debonding. We have found that a typical composition for direct automotive glazing should comprise about 3% microspheres in the cleaner and 5% in the primer for thermosetting adhesives and 5-10% for thermoplastic adhesives. For metal bonded surfaces the composition should be in the range 5-10% at their interface surfaces in the absence of a primer. In the instance where the adhesive layer is of a comparable thickness to the diameter of the microsphere and can be activated on both sides of the layer about 5% of microspheres is required.

| Ref | Average Diameter (μm) | Activation Range (C./Watts) | Activation Source | Use |
|---|---|---|---|---|
| 90 | 30-50 | 80-100 C. | IR; Air; UV; Water | Curing adhesive compositions |
| 91 | 10-50 | 110-220 C. 500-1500 Watts | IR; Electricity | Automotive, aircraft and train glazing, car parts and panels |
| 820a | 10-30 | 150-180 C. | IR; Electricity | Plastic composite - glass layers |
| 820b | Approx 4 | 100-120 C. | IR; Electricity | Aircraft glazing Floor covering |
| 93-98 | 10-40 | 150-180 C. | IR; Electricity | Aluminium or other sheet metal-plastic layers |
| 98-120 | 4-10 | 100-120 C. | IR; Hot air vapour | Dispersion of nanoparticles on their porous initial shell surface to avoid clustering in a mix with plastic binders and solvents |
| 551 | 4-10 | 40-80 C. | Hot water or air; IR; UV; laser or concentrated light systems | Decorative paper, dentistry, medical surgery, sports equipment |

The invention claimed is:

1. A method of bonding and debonding two or more surfaces or supports or layers of an adhesive system, the method comprising:
   (i) providing a first power level of thermal radiation and/or thermal conduction and/or thermal energy which passes through an adhesive composition comprising:
      (a) an adhesive agent,
      (b) a cleaner,
      (c) a primer,
      (d) a first set of thermoexpandable microspheres associated with curing and bonding, and
      (e) a second set of thermoexpandable microspheres associated with debonding,
      wherein said second set of thermoexpandable microspheres comprises microspheres encapsulating an expanding agent, said microspheres encapsulating an expanding agent comprising about 3-5%, by weight, of the cleaner and about 5-10%, by weight, of the primer,
   such that the contents of the first set of thermoexpandable microspheres leach or migrate through the porous shells of the first set of thermoexpandable microspheres into the matrix of the adhesive composition, thereby curing the adhesive composition; and
   (ii) providing a second power level of thermal radiation and/or thermal conduction and/or thermal energy which concentrates on the surfaces or supports or layers of the adhesive system so as to expand the second set of thermoexpandable microspheres, thereby weakening the adhesive forces in the interface of the adhesive system.

2. The method according to claim 1, wherein the first power level of thermal radiation and/or thermal conduction and/or thermal energy which passes through the adhesive composition causes the contents of the first set of thermoexpandable microspheres to leach or migrate through the porous shells of the first set of thermoexandable microspheres into the matrix of the adhesive composition.

3. The method according to claim 1, wherein the first set of thermoexpandable microspheres comprises a blowing agent, which acts as a carrier for the contents of the first set of thermoexpandable microspheres.

4. The method according to claim 1, wherein step (i) is performed after adhesive composition deposition and step (ii) is performed days, weeks, months or years apart.

5. The method according to claim 1, wherein the second set of thermoexpandable microspheres comprise a co-polymeric shell which encapsulates an expanding agent and the first set of thermoexpandable microspheres comprise a co-polymeric shell which encapsulates a curing agent or catalyst mixed with an expanding agent.

6. The method according to claim 5, wherein the expanding agents are selected from the group comprising an expandable gas, a volatile agent, a sublimation agent, water, an agent which attracts water or an explosive agent.

7. The method according to claim 1, wherein the microspheres associated with curing and bonding have a larger cross sectional diameter than those associated with debonding.

8. The method according to claim 1, further comprising a curing activator.

9. The method according to claim 8, wherein the curing activator is activated by an applied thermal energy or by its own energy.

10. The method according to claim 1, wherein the adhesive agent is polyurethane or polyvinylchloride or an MS polymer or an epoxy resin.

11. The method according to claim 1, wherein the microspheres associated with debonding are activated in a temperature range of about 45 to 220° C.

12. The method according to claim 1, wherein the microspheres associated with curing and bonding are activated at a different temperature from those used in the debonding phase, the temperature difference being between 20 to 100° C.

13. The method according to claim 1, wherein the first set of thermoexpandable microspheres comprises microspheres encapsulating a curing agent or catalyst, said microspheres encapsulating the curing agent or catalyst constituting about 2-3%, by weight, of the adhesive composition.

14. The method according to claim 1, wherein the thermal radiation and/or thermal conduction and/or thermal energy provided to the first and second sets of thermoexpandable microspheres is provided by a means comprising a source of IR or UV electromagnetic radiation, or from a convection oven or from electrical means, a battery or a laser or from an ultrasonic source or from gas or from white light or microwaves or sonic waves.

15. The method according to claim 14, wherein in the instance of using IR radiation it is provided as a wavelength of about 800-1400 nm to 2000-6000 nm and concentrates heating radiation on the first and second sets of thermoexpandable microspheres in order to reach their activation expanding temperature in advance of the adhesive matrix degradation temperature.

16. The method according to claim 1, wherein the first and second sets of thermoexpandable microspheres are provided embedded in or coated on to a tape, mesh or film, or attached to a wire, filament or fiber.

17. The method according to claim 1, wherein the first and second sets of thermoexpandable microspheres are coated in a black material.

18. The method according to claim 1, wherein either, or both, of the first and second sets of thermoexpandable microspheres are coated with or encapsulate one or more monomers and/or nanoparticles.

19. The method according to claim 1, wherein either, or both, of the first and second sets of thermoexpandable microspheres acts as a vehicle, transporter, carrier, chemical or physical barrier or dispersing aid to prevent the clustering of one or more molecules, nanoparticles, detergents or cleaning agents in a mixture comprising a binder and solvent, the thermoexpandable microspheres either encapsulating a desired agent or being coated therewith.

20. The method according to claim 1, wherein the first and second sets of thermoexpandable microspheres are attached to a contact surface of one or more of the components which it is desired to attach and/or separate or on an internal surface of the components or at an interface of the cleaner and/or primer of said components.

21. The method according to claim 1, wherein the adhesive composition comprising the first and second sets of thermoexpandable microspheres is provided in a continuous or discontinuous predefined path substantially around the periphery of one or more of the surfaces or supports or layers of the adhesive system, said predefined path being in the form of a channel, a groove, a line or concentric circles.

22. The method according to claim 1, wherein the depth and breadth or thickness and wideness of the adhesive composition may be uniform or may vary as required in areas of the surface(s) or support(s) or layer(s) which need to be attached or detached.

23. The method according to claim 1, wherein the adhesive composition is sandwiched between the surfaces or supports or layers of the adhesive system.

24. The method according to claim 1, wherein the adhesive composition further comprises a third set of thermoexpandable microspheres.

25. An adhesive composition comprising an adhesive agent and dispersed therein a first set of thermoexpandable microspheres being associated with curing and bonding and a second set of thermoexpandable microspheres being associated with debonding, wherein the first and second sets of thermoexpandable microspheres are dispersed therein in an arrangement of micro-wires, electrically conductive fibres or aluminum/steel filaments and are not simultaneously activatable.

26. The adhesive composition according to claim 25, wherein the first and second sets of thermoexpandable microspheres are dispersed in an arrangement of micro-wires so as to form a polygonal arrangement.

27. The adhesive composition according to claim 26, wherein the micro-wires are about 100-200μ in length.

28. The adhesive composition according to claim 27, wherein the micro-wires are about 2-20μ in diameter.

29. The adhesive composition according to claim 26, wherein the composition comprises about 1-10% volume of micro-wires.

30. A method of attaching or bonding two or more surfaces or supports or layers together comprising:
    (i) applying an adhesive composition according to claim 25 to one or more of the surfaces or supports or layers which are to be bonded together; and
    (ii) supplying sufficient thermal radiation and/or thermal conduction and/or thermal energy to the adhesive composition via contact with one or more of the surfaces or supports or layers so as to cause a proportion of the first set of thermoexpandable microspheres to expand and optionally to further release a curing agent into the composition during the bonding process.

31. The method according to claim 30, wherein the adhesive composition is sandwiched between the surfaces or supports or layers which are to be bonded together.

32. A method of detaching or debonding two or more surfaces that have been bonded together comprising, supplying sufficient thermal radiation and/or thermal conduction and/or thermal energy to a surface having coated thereon or attached thereto the adhesive composition of claim 25, the thermal energy being supplied to one or more of the contact surfaces of each item which are to be detached/separated so as to cause the second set of thermoexpandable microspheres to increase in volume and to become a pressure activator so as to debond the interfaces of the adhesion system.

33. The method according to claim 32, wherein said method is performed days, weeks, months or years after deposition and curing of the adhesive composition.

34. The adhesive composition according to claim 25, wherein the microwires, electrically conductive fibres or aluminum/steel filaments are dispersed so as to create a tangle of electrical conductors.

35. The adhesive composition according to claim 25, wherein the first and second sets of microspheres comprise about 5-10%, by weight of the adhesive composition.

36. The adhesive composition according to claim 25, further comprising a third set of thermoexpandable microspheres.

37. The adhesive composition according to claim 25, wherein either, or both, of the first and second sets of thermoexpandable microspheres are coated with or encapsulate one or more monomers and/or nanoparticles and/or detergents and/or gold.

38. The adhesive composition according to claim 25, wherein said adhesive composition is embedded in or coated on a tape or mesh or film.

39. The adhesive composition according to claim 25, wherein the first and second sets of microspheres are activated at different temperatures, the temperature difference being between 20 to 100° C.

40. A method of bonding an adhesive composition, the adhesive composition being present at an interface and being placed between two or more surfaces of vehicle glazing or vehicle panel(s) or part(s), the adhesive composition comprising an adhesive agent and/or cleaner and/or primer and thermoexpandable microspheres dispersed therein in an arrangement of micro-wires, electrically conductive fibres or aluminum/steel filaments, the microspheres having a diameter of between 30-50 µm and an activation temperature range of between 50-100° C. and encapsulating at least one curing agent and/or catalyst and/or activator, said bonding being effected by exposing the microspheres to a power level of thermal radiation and/or thermal energy that results in a temperature received by the microspheres in the range of 50-100° C.

41. A method of curing an adhesive and de-bonding the same adhesive from automotive glazing, panels or parts comprising:
(i) applying an adhesive composition between two or more surfaces of the glazing, panel(s) or part(s), said adhesive composition comprising an adhesive and thermoexpandable microspheres dispersed therein in an arrangement of micro-wires, electrically conductive fibres or aluminum/steel filaments, said thermoexpandable microspheres comprising a first set of thermoexpandable microspheres having a diameter of between 30-50 µm and an activation temperature range of between 50-100 C.° and a second set of thermoexpandable microspheres having a diameter of between 10-50 µm and an activation temperature range of between 110-210 C.°,
(ii) activating curing of the composition by exposing it to a first power level of thermal radiation and/or thermal energy that results in a temperature received by the thermoexpandable microspheres in the range of 50-100 C.°; and
(iii) debonding the adhesive system at its interfaces by exposing it to a second power level of thermal radiation and/or thermal energy that results in a temperature received by the thermoexpandable microspheres in the range of 110-210 C.°.

42. A method according to claim 41 for the removal of vehicle glazing, panels or parts in an end of vehicle life process.

* * * * *